United States Patent [19]
Suzuki et al.

[11] Patent Number: 5,756,227
[45] Date of Patent: May 26, 1998

[54] BATTERY ASSEMBLY WITH TEMPERATURE CONTROL MECHANISM

[75] Inventors: Shigeru Suzuki; Yasuo Kitami; Toshiyuki Watanabe; Minoru Nakajima; Yasuyuki Sando; Yoshinori Mita; Koichiro Ozawa; Harumi Takedomi, all of Wako, Japan

[73] Assignee: Honda Giken Kogyo Kabushiki Kaisha, Tokyo, Japan

[21] Appl. No.: 558,392

[22] Filed: Nov. 16, 1995

[30] Foreign Application Priority Data

Nov. 18, 1994 [JP] Japan .................. 6-285472

[51] Int. Cl.⁶ .................. H01M 10/50; F28F 3/08
[52] U.S. Cl. .................. 429/62; 429/120
[58] Field of Search .................. 429/62, 120, 148

[56] References Cited

U.S. PATENT DOCUMENTS

| | | | |
|---|---|---|---|
| 4,897,322 | 1/1990 | Jessen | 429/62 |
| 5,356,735 | 10/1994 | Meadows et al. | 429/120 |
| 5,385,793 | 1/1995 | Tiedemann et al. | 429/62 |
| 5,501,918 | 3/1996 | Gruenstern et al. | 429/120 |
| 5,558,950 | 9/1996 | Oushinsky et al. | 429/101 |

FOREIGN PATENT DOCUMENTS 7-192774  7/1995  Japan .

*Primary Examiner*—Kathryn L. Gorgos
*Assistant Examiner*—William T. Leader
*Attorney, Agent, or Firm*—Armstrong, Westerman, Hattori, McLeland & Naughton

[57] ABSTRACT

A battery assembly has a temperature control mechanism for effecting cooling or heating unit batteries for operation in a desired temperature range. First heat-exchange planar members of respective heat-transfer plates are sandwiched between the unit batteries that are arranged in an array, and second heat-exchange planar members thereof are held against transverse narrow side walls of the unit batteries. The unit batteries and the heat-transfer plates are securely fastened together by holder plates. Heat produced when the unit batteries are in operation is transferred through the first and second heat-exchange planar members of the heat-transfer plates and dissipated into an appropriate cooling medium, such as atmospheric air or another cooling fluid, through a heat-exchange.

19 Claims, 16 Drawing Sheets

5,756,227

1

BATTERY ASSEMBLY WITH TEMPERATURE CONTROL MECHANISM

BACKGROUND OF THE INVENTION

1. Field of the Invention

The present invention relates to a battery assembly with a temperature control mechanism, and more particularly to a battery assembly having a temperature control mechanism of simple structure which is capable of cooling and heating a plurality of closely positioned unit batteries of the battery assembly for efficient utilization of electrical energy stored in the batteries.

2. Description of the Related Art

Electric vehicles, for example, carry a battery assembly composed of an array of closely positioned unit batteries. Because the output voltage of each of the unit batteries is relatively low, the unit batteries are connected to provide a combined voltage of desired level.

Preferably, the output voltages of the respective unit batteries should be as uniform as possible for efficiently producing a desired voltage from the unit batteries, and the unit batteries should be used in a predetermined temperature range for keeping the unit batteries for sustained longevity. In order to use the battery assembly in a preferable temperature range, it has been attempted to control the temperature of the battery assembly for cooling or heating the battery assembly.

Japanese patent application No. 5-348395 discloses a structure for introducing cooling air with a crossflow fan to forcibly and uniformly cool a linear array of unit batteries so that the unit batteries will be used in a desired temperature range.

SUMMARY OF THE INVENTION

It is a general object of the present invention to provide a battery assembly combined with a temperature control mechanism improved for more efficient use and greater durability.

A principal object of the present invention is to provide a battery assembly having heat-transfer plates sandwiched between unit batteries and arranged for an efficient heat transfer to the environment.

Another object of the present invention is to provide a battery assembly composed of unit batteries and heat-transfer plates which are integrally fastened together through an inexpensive structure.

Still another object of the present invention is to provide a battery assembly which has a means for cooling or heating an array of unit batteries into a desired temperature range in a short period of time.

Yet still another object of the present invention is to provide a battery assembly which is relatively lightweight.

The above and other objects, features, and advantages of the present invention will become more apparent from the following description when taken in conjunction with the accompanying drawings in which preferred embodiments of the present invention are shown by way of illustrative example.

2

Figure 3:
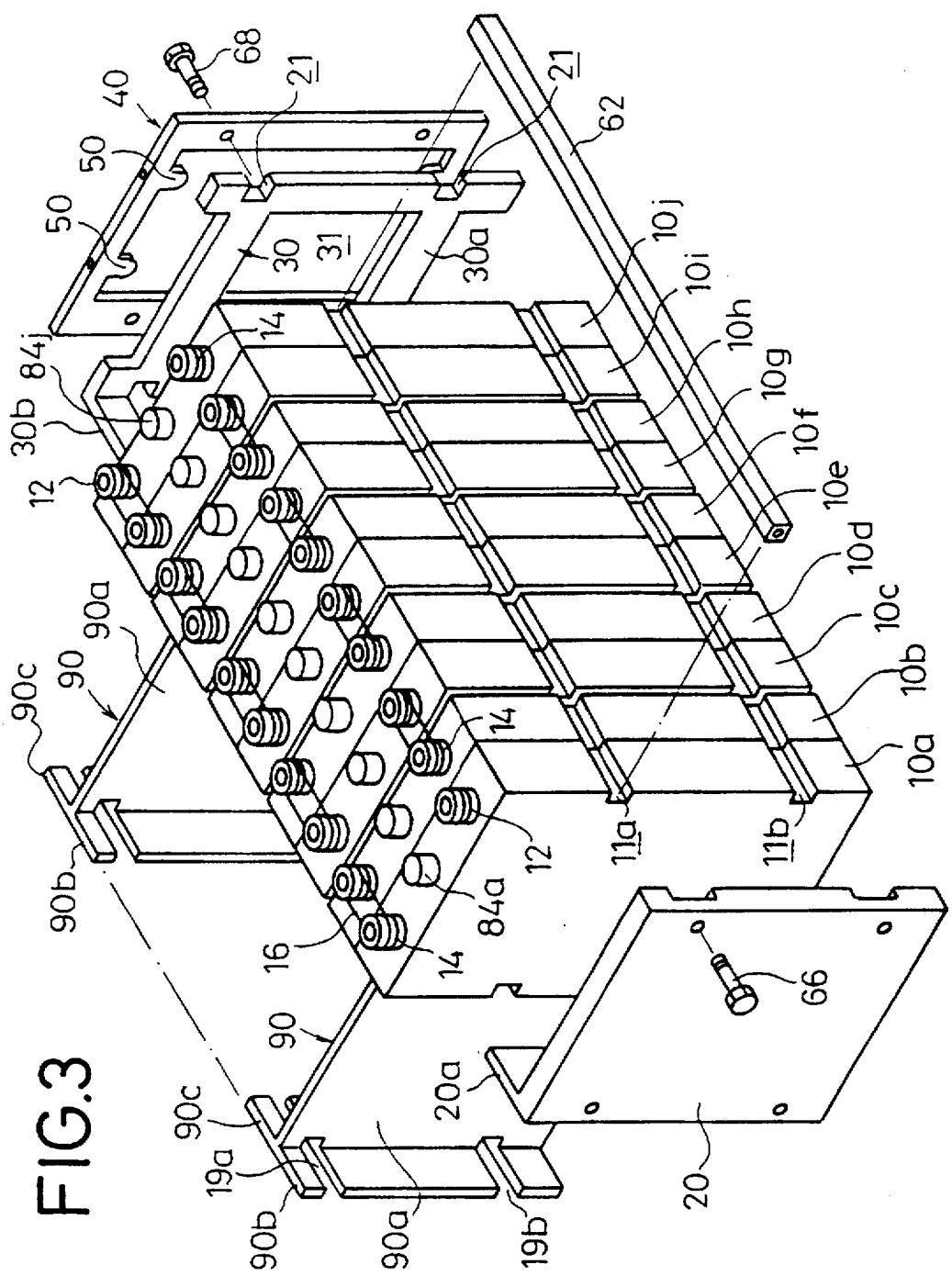
Figure 4:
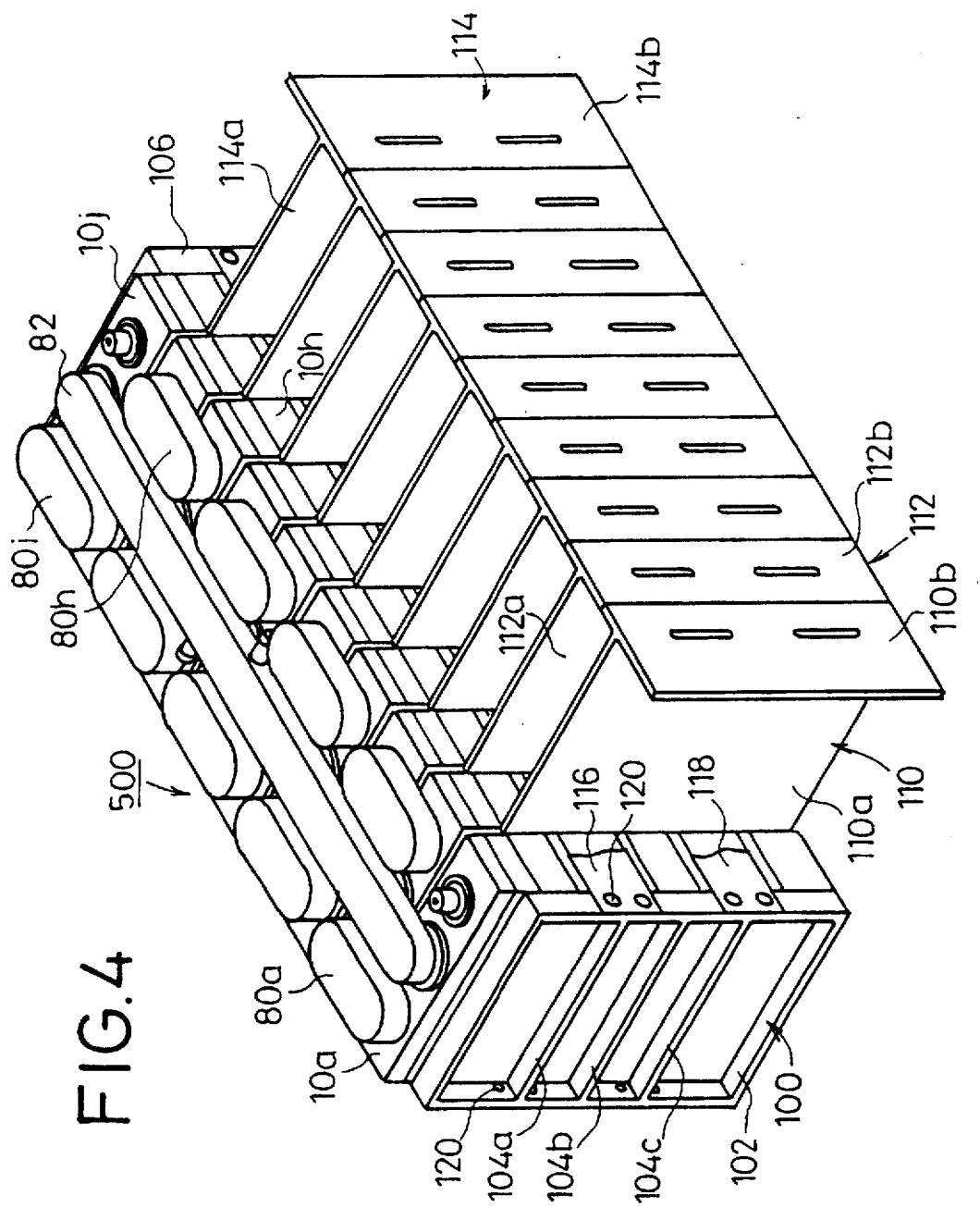
Figure 5:
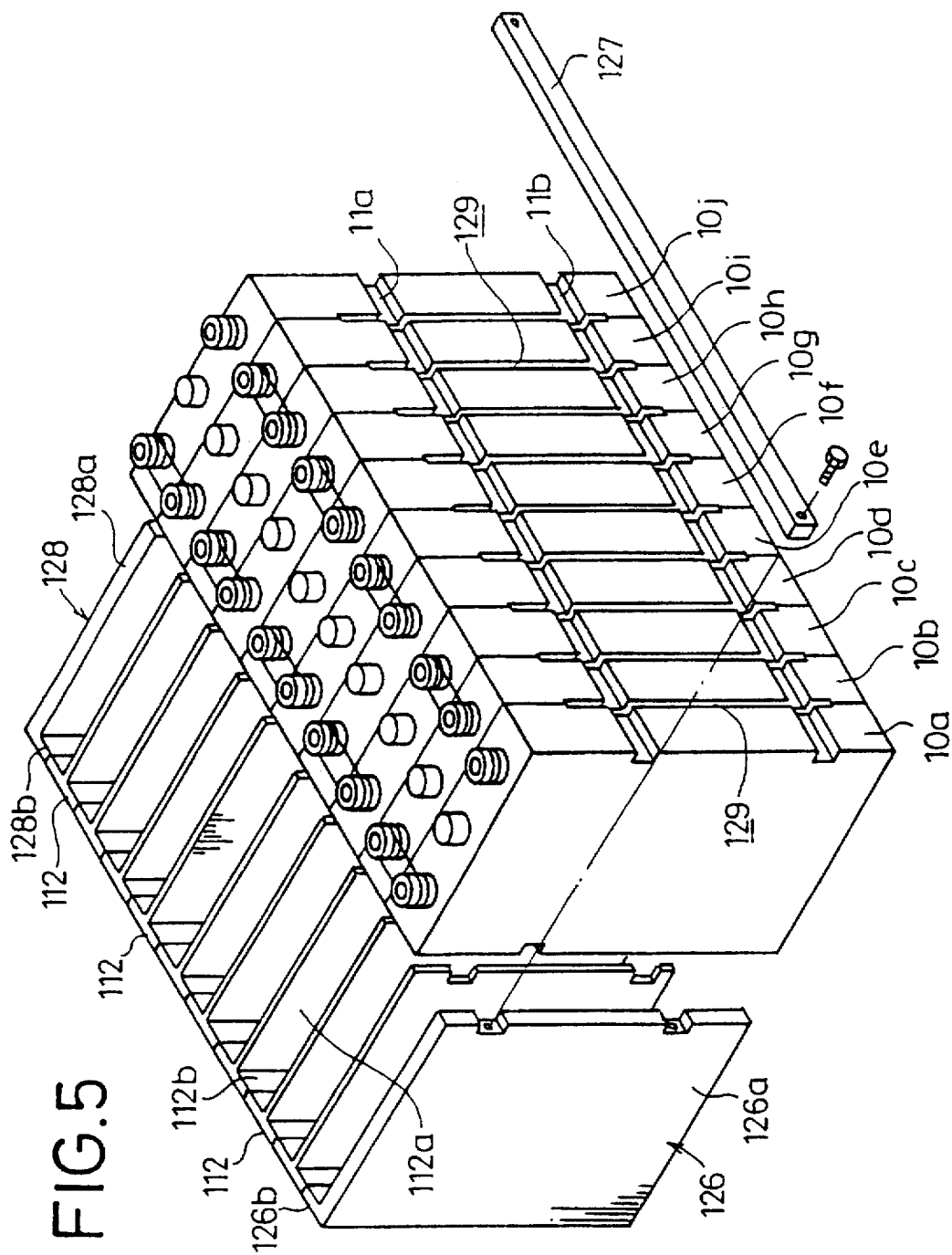
Figure 6:
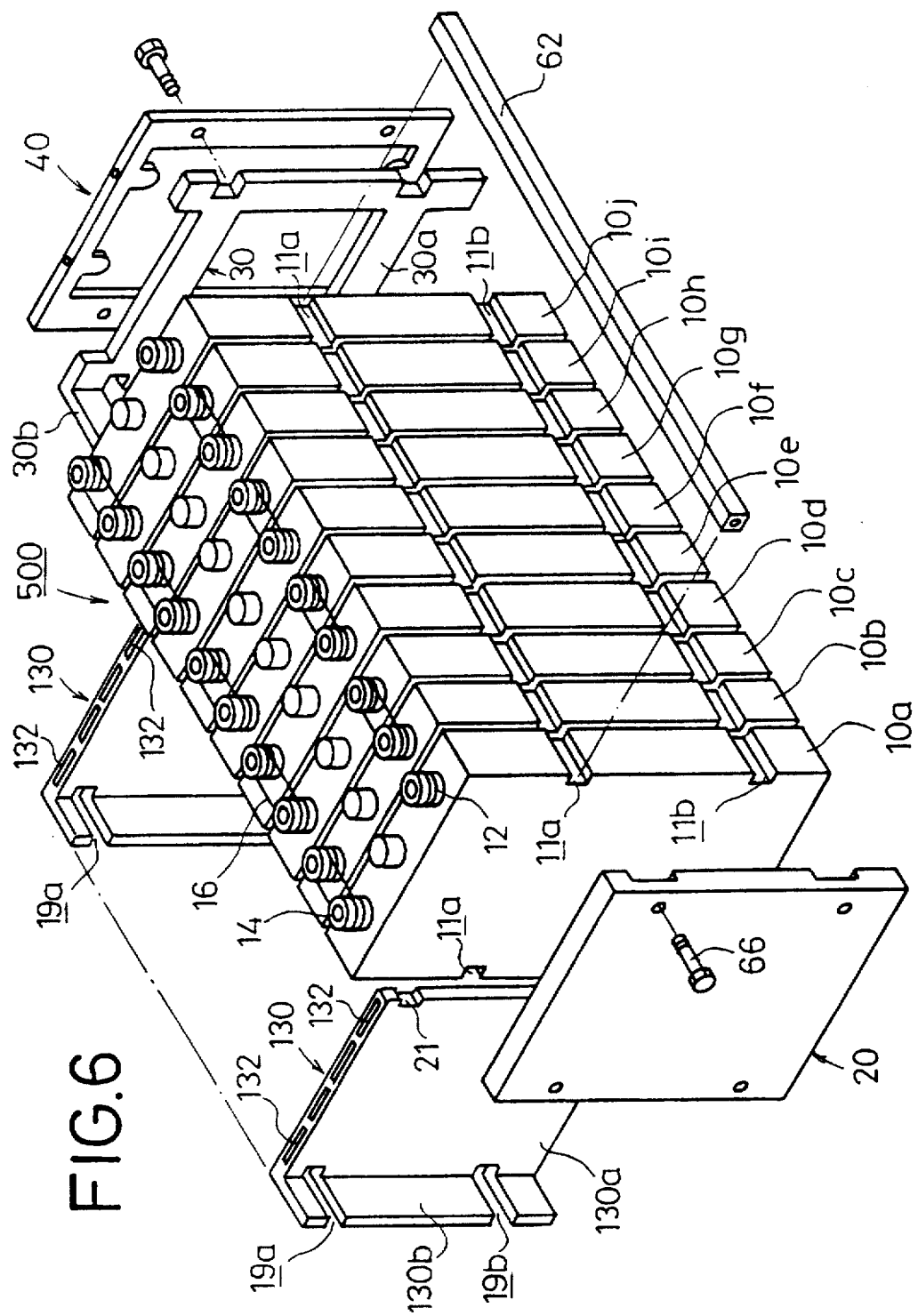
Figure 7:
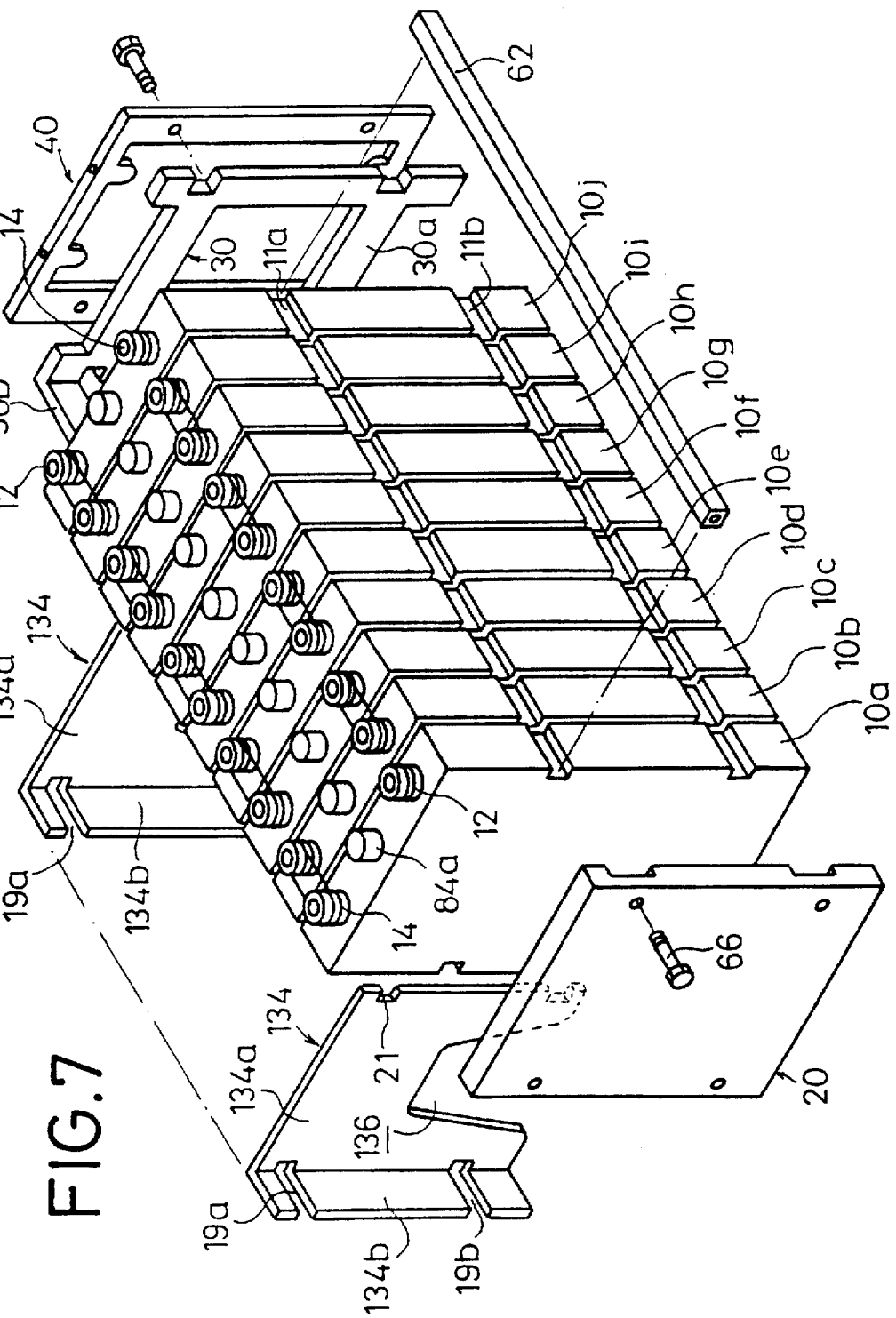
Figure 8:
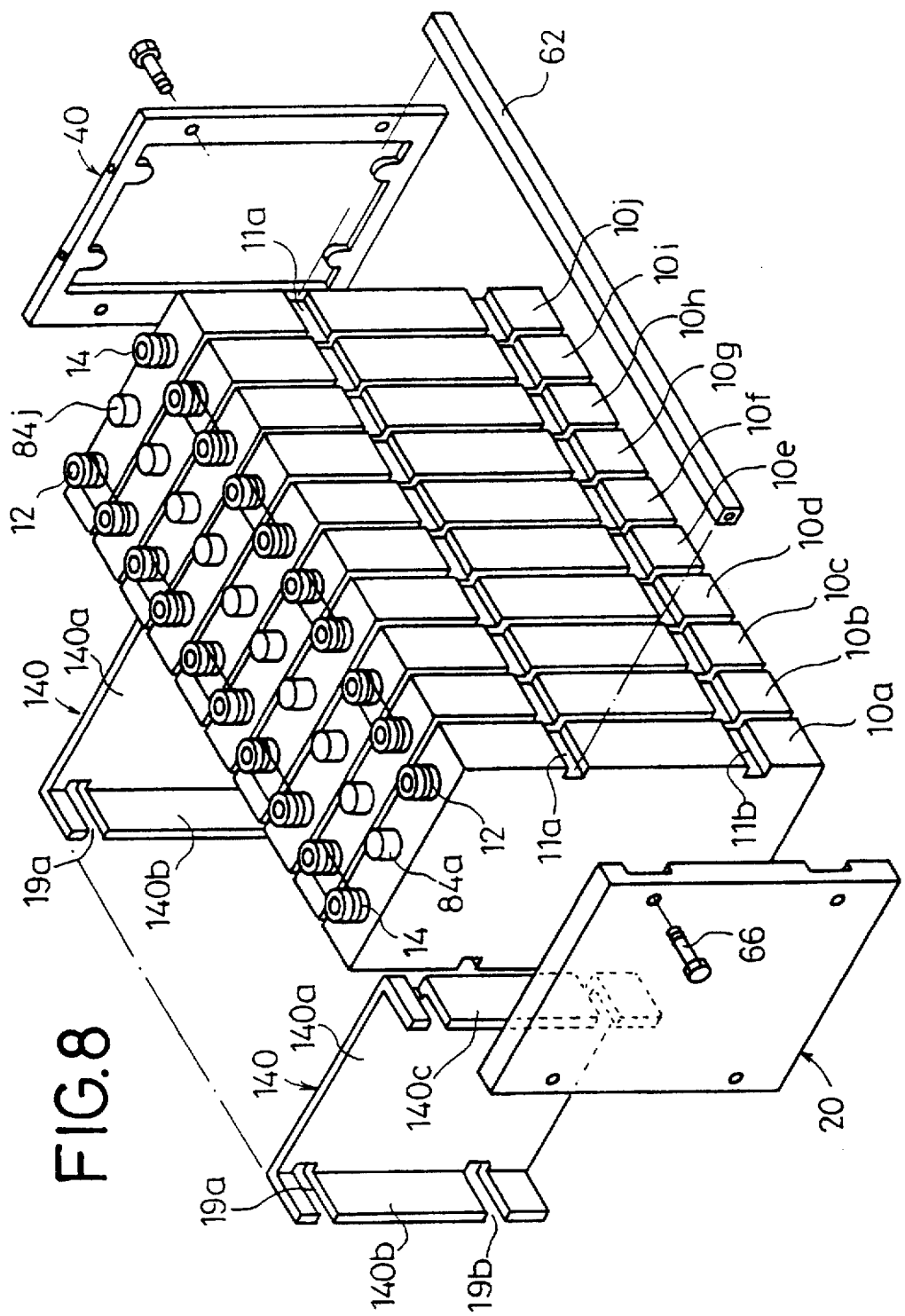
Figure 9:
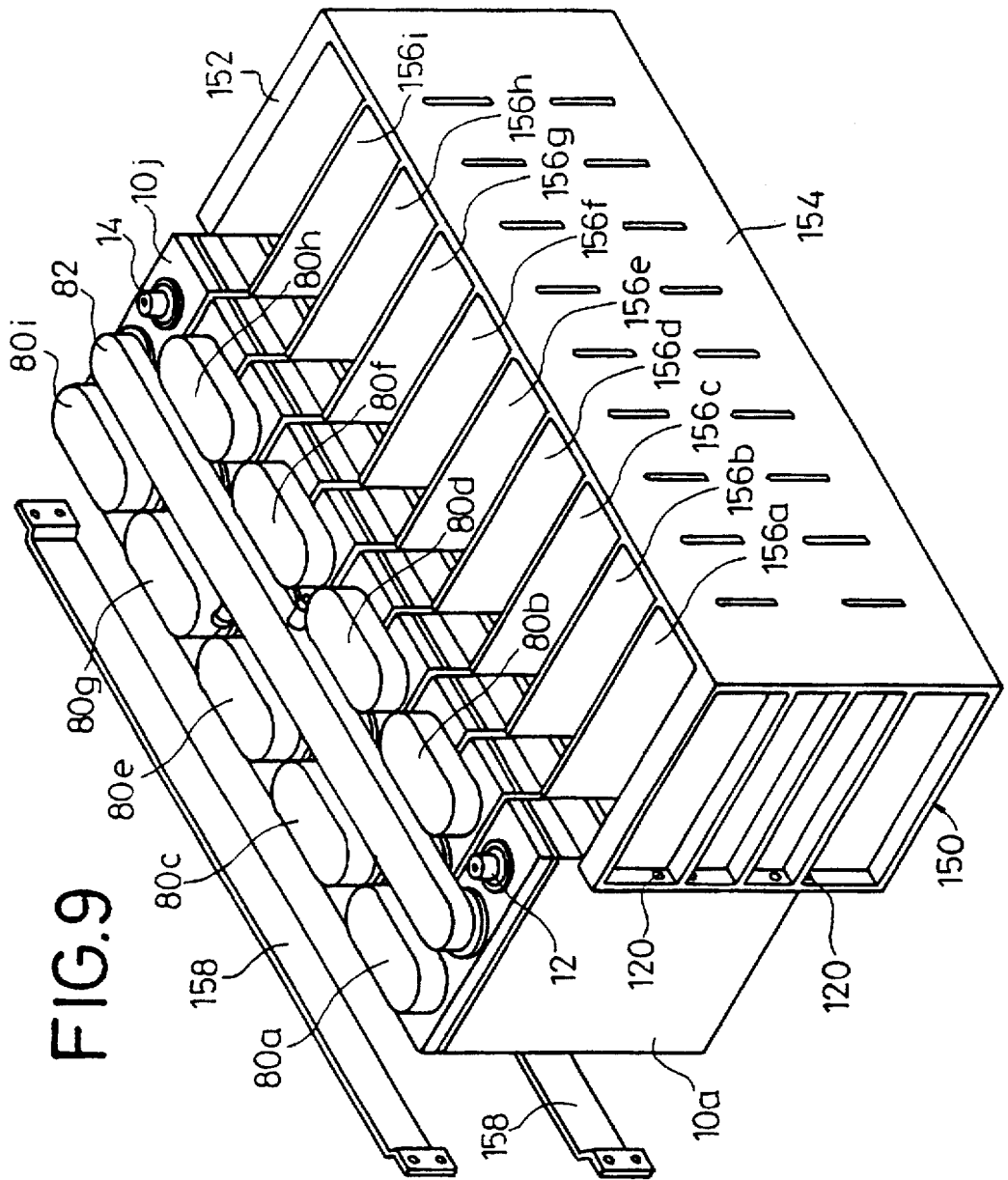
Figure 10:
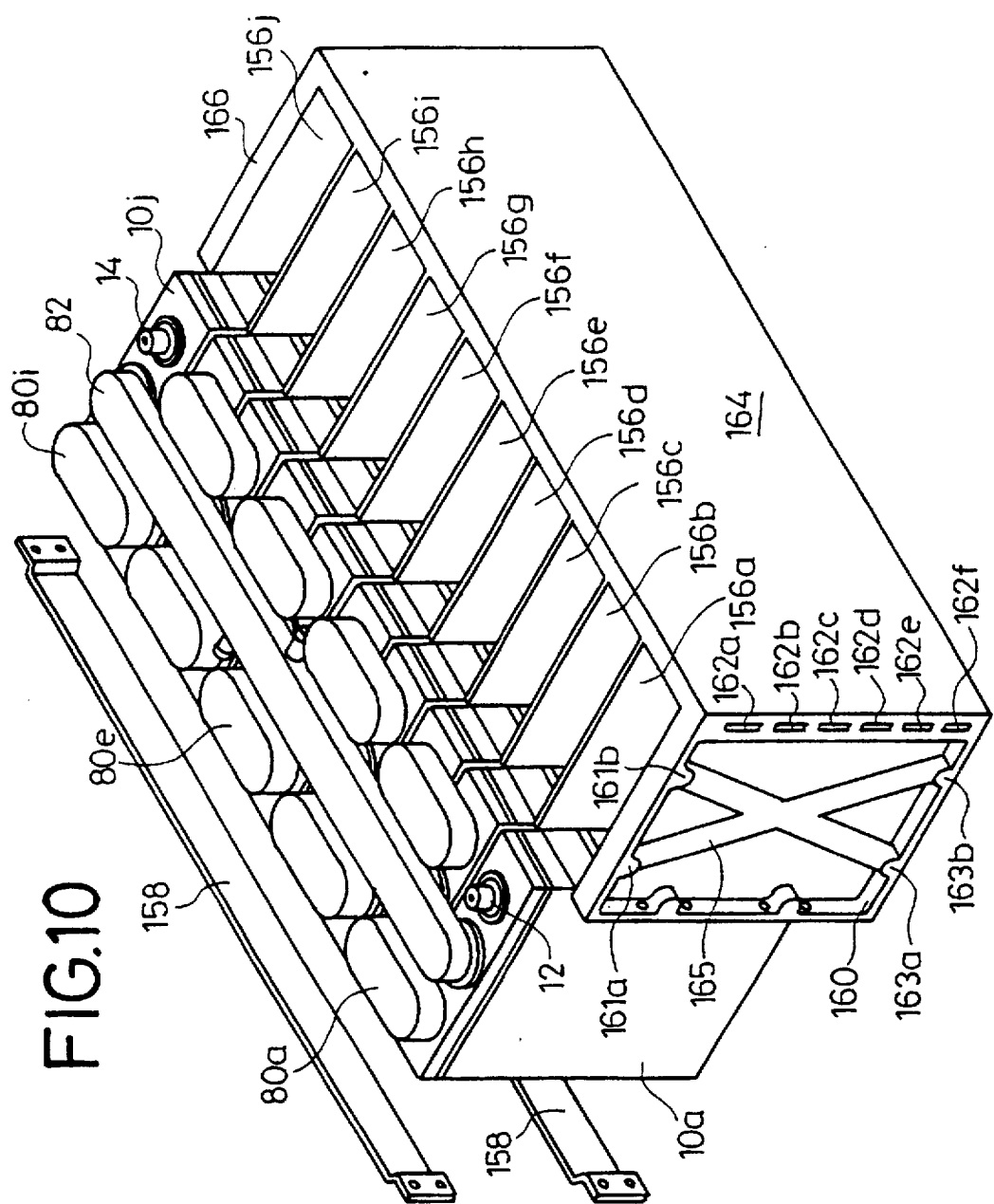
Figure 11:
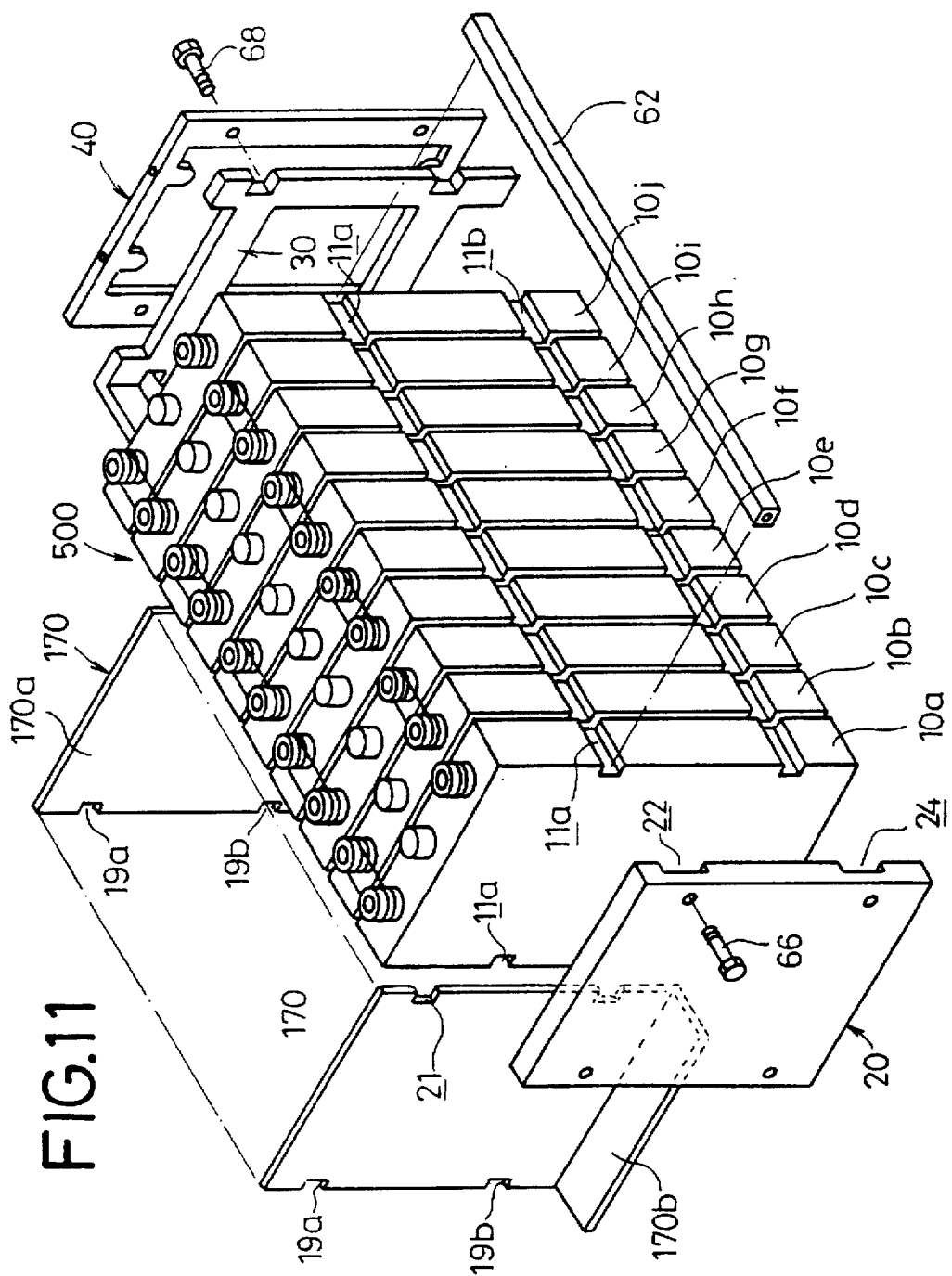
Figure 12:
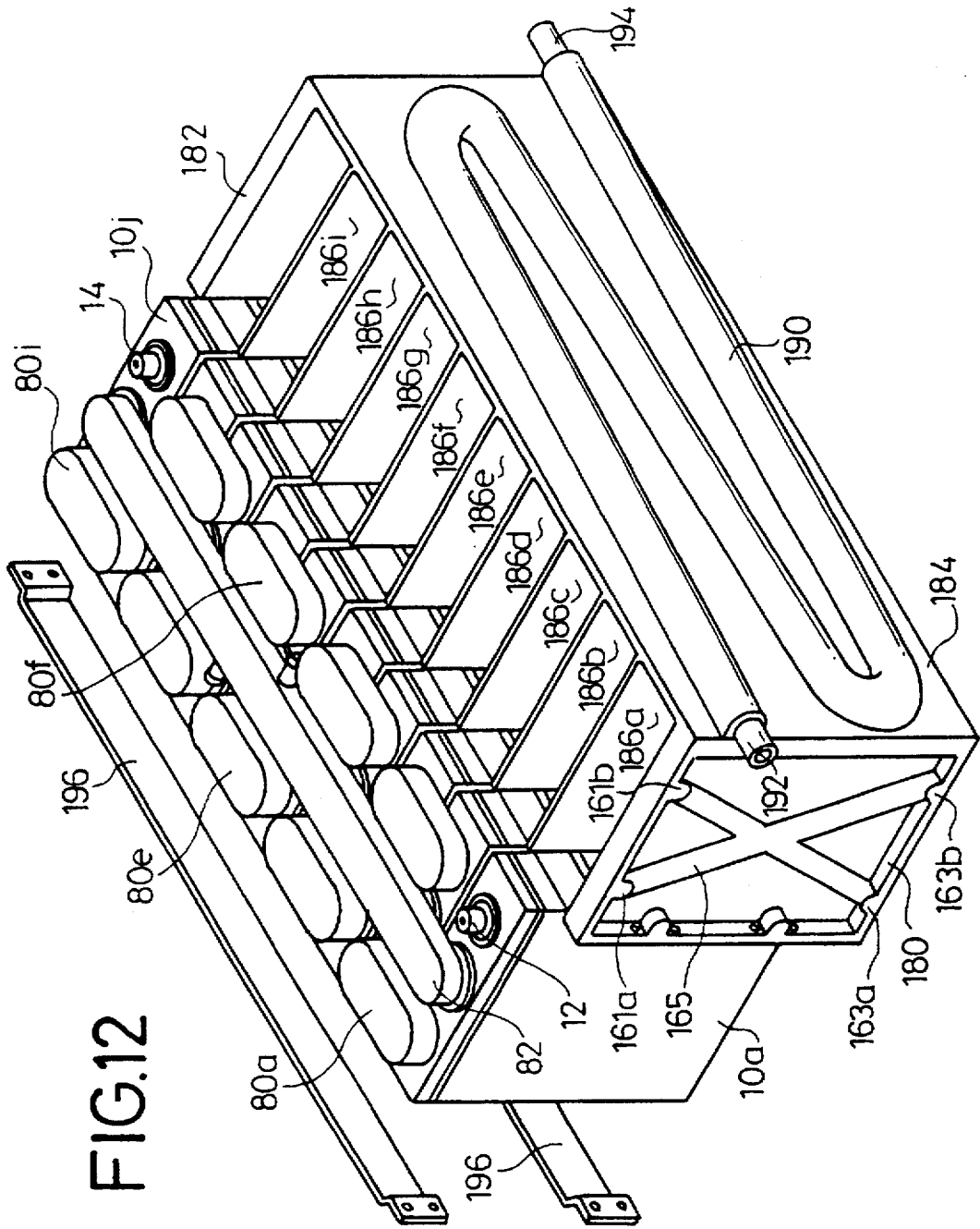
Figure 13:
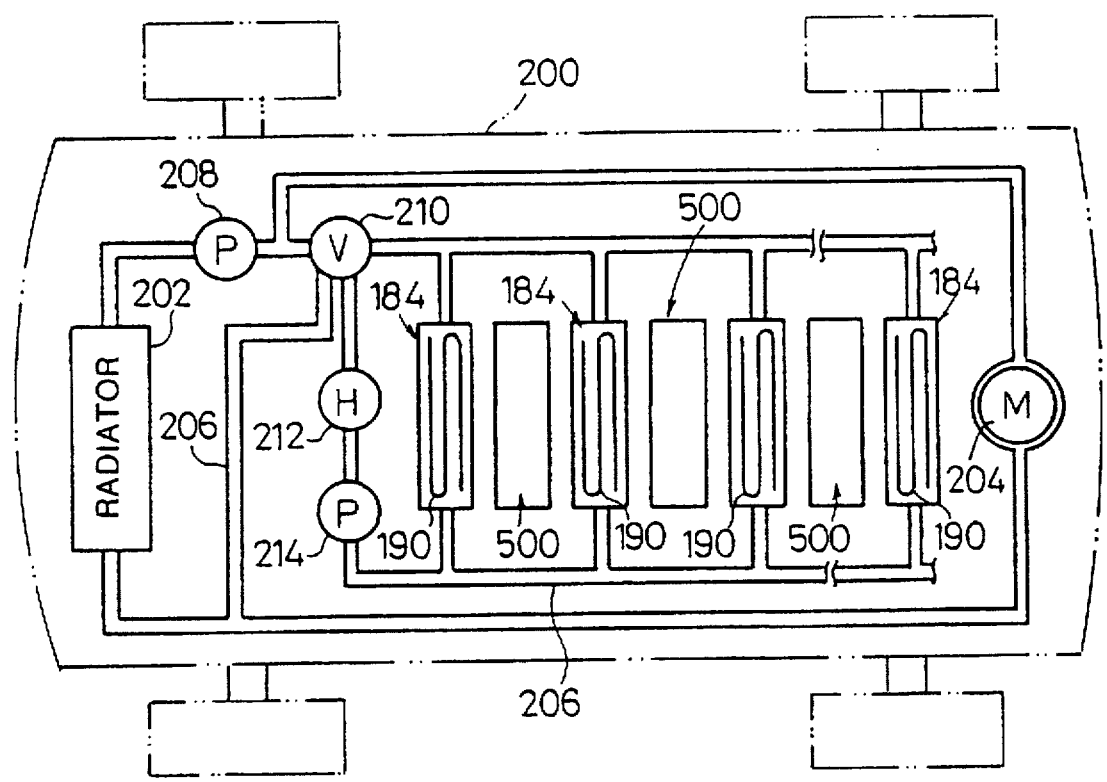
Figure 14:
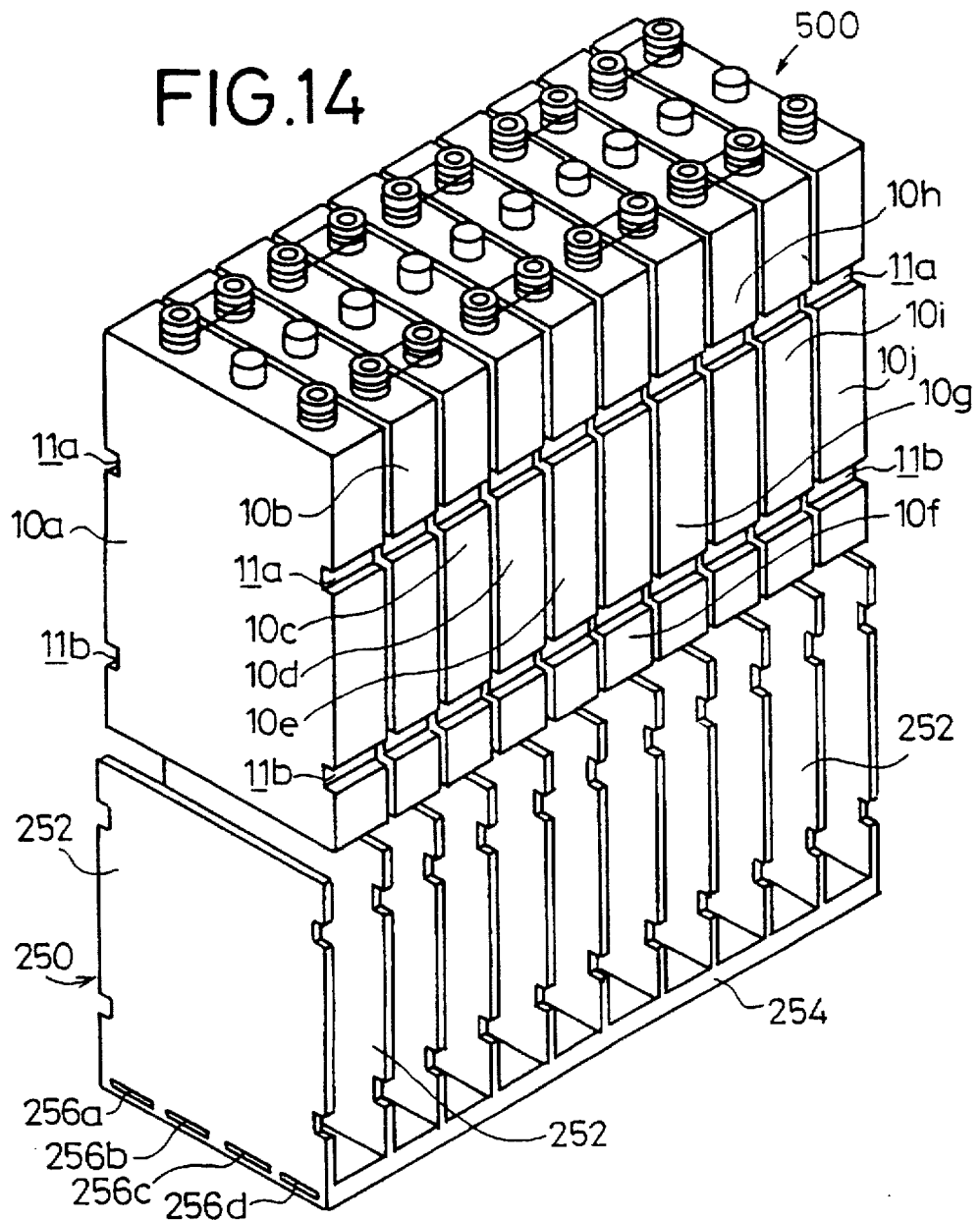
Figure 15:
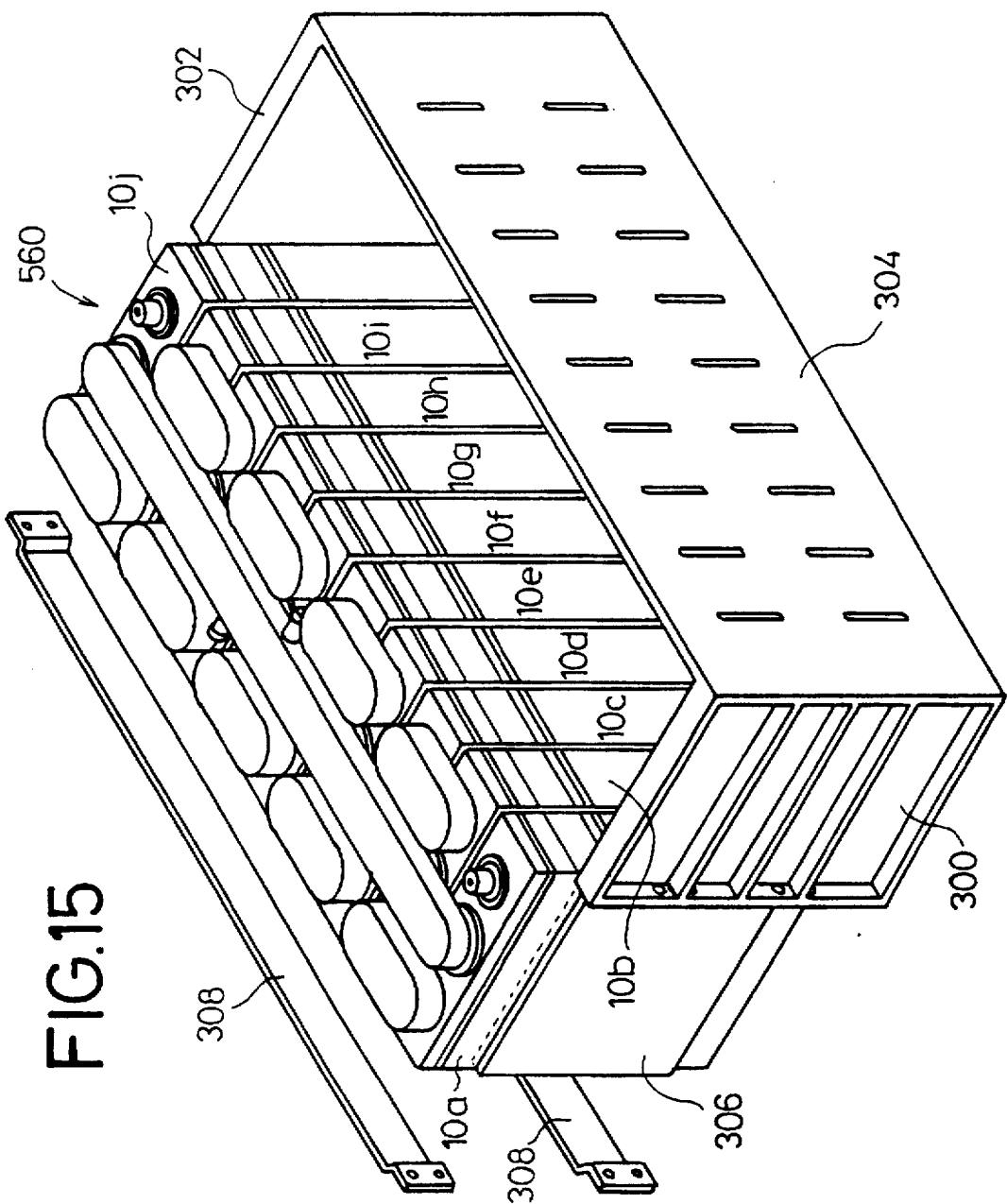

FIG. 3 is an exploded perspective view of a battery assembly containing heat exchange members according to a second embodiment of the present invention;

FIG. 4 is an exploded perspective view of a battery assembly according to a third embodiment of the present invention;

FIG. 5 is an exploded perspective view of a battery assembly according to a fourth embodiment of the present invention;

FIG. 6 is an exploded perspective view of a battery assembly according to a fifth embodiment of the present invention;

FIG. 7 is an exploded perspective view of a battery assembly according to a sixth embodiment of the present invention;

FIG. 8 is an exploded perspective view of a battery assembly according to a seventh embodiment of the present invention;

FIG. 9 is an exploded perspective view of a battery assembly according to an eighth embodiment of the present invention;

FIG. 10 is an exploded perspective view of a battery assembly according to a ninth embodiment of the present invention;

FIG. 11 is an exploded perspective view of a battery assembly according to a tenth embodiment of the present invention;

FIG. 12 is an exploded perspective view of a battery assembly according to an eleventh embodiment of the present invention;

FIG. 13 is a schematic view of a system for water-cooling or -heating the battery assembly as shown in FIG. 12, which is mounted on an electric vehicle;

FIG. 14 is an exploded perspective view of a battery assembly according to a twelfth embodiment of the present invention; and FIG. 15 is an exploded perspective view of a battery assembly according to a thirteenth embodiment of the present invention.

Figure 16:
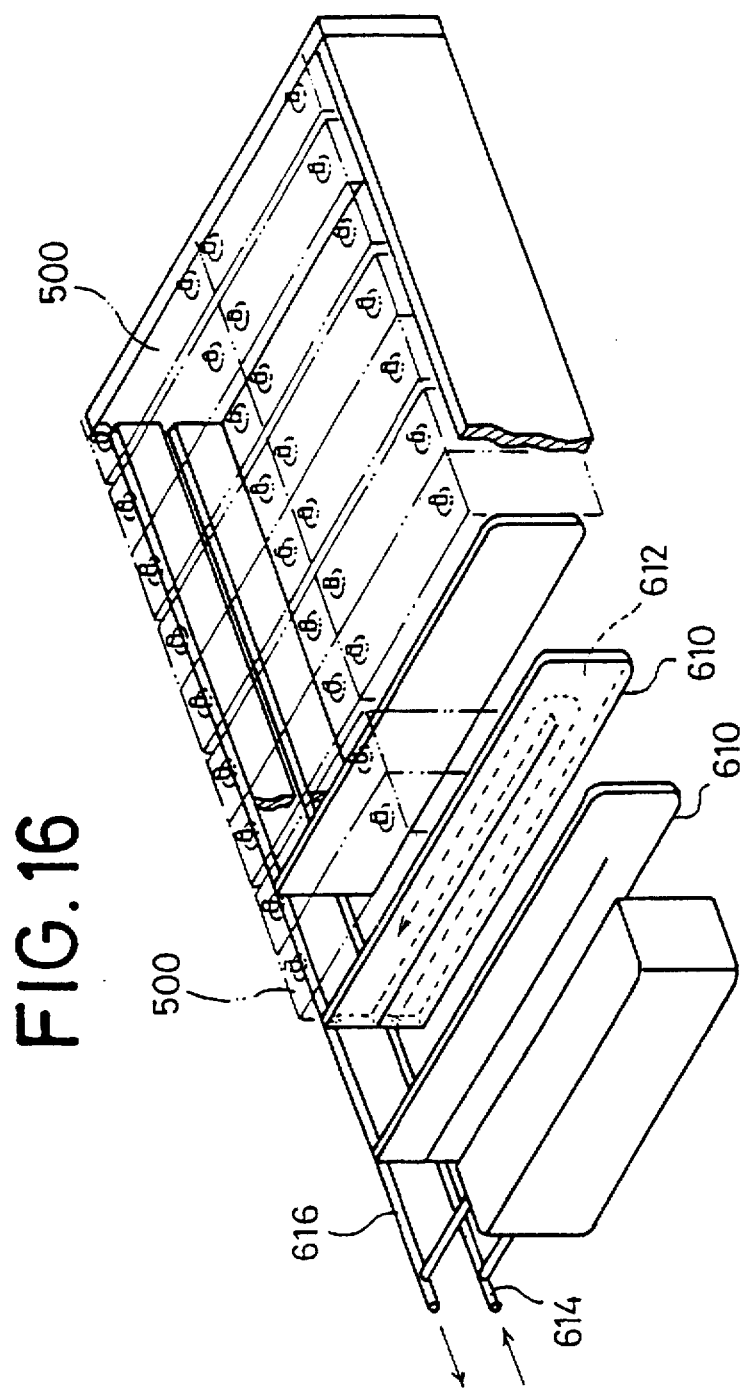

FIG. 16 is an exploded perspective view of a battery assembly according to a fourteenth embodiment of the present invention, with water jackets incorporated therein.

DETAILED DESCRIPTION OF THE PREFERRED EMBODIMENTS

Like or corresponding reference characters denote like or corresponding parts throughout views.

Figure 1:
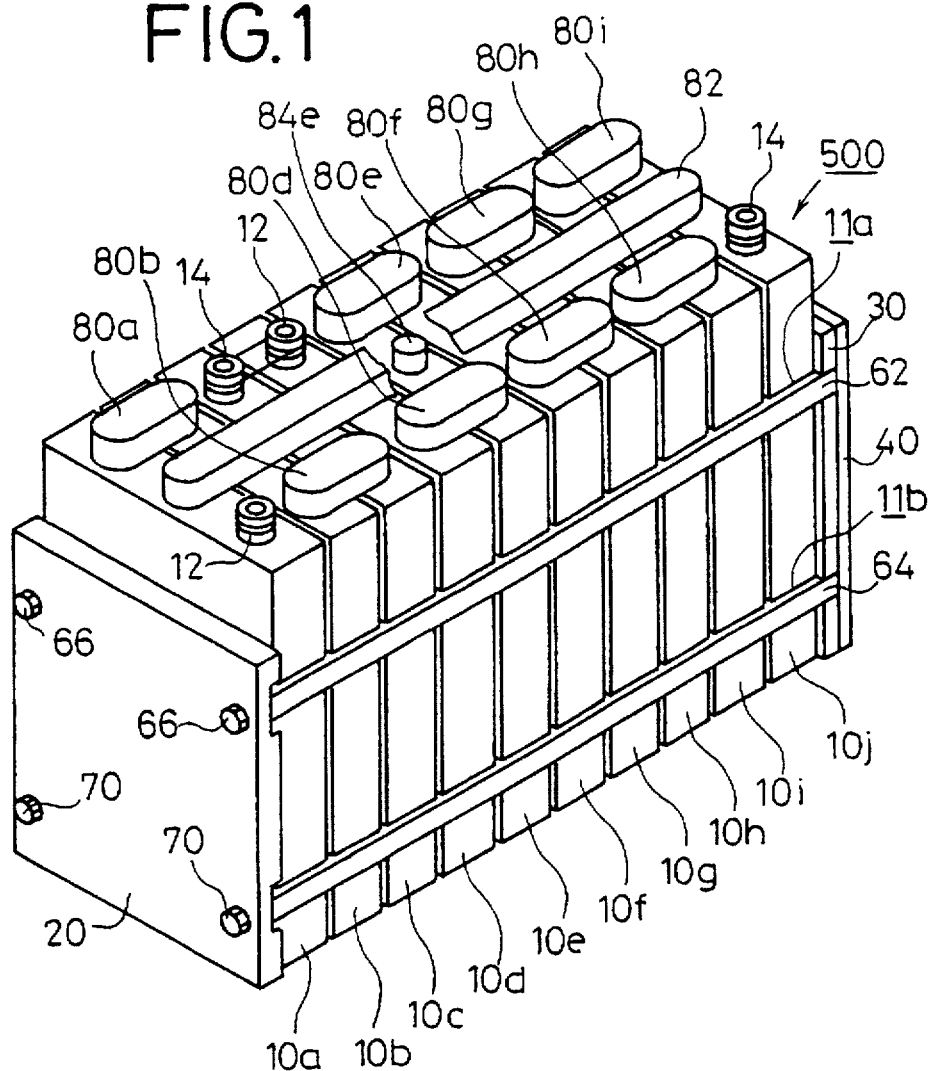
FIG. 1 is a perspective view of a battery assembly of a type capable of use of the present invention.
Figure 2:
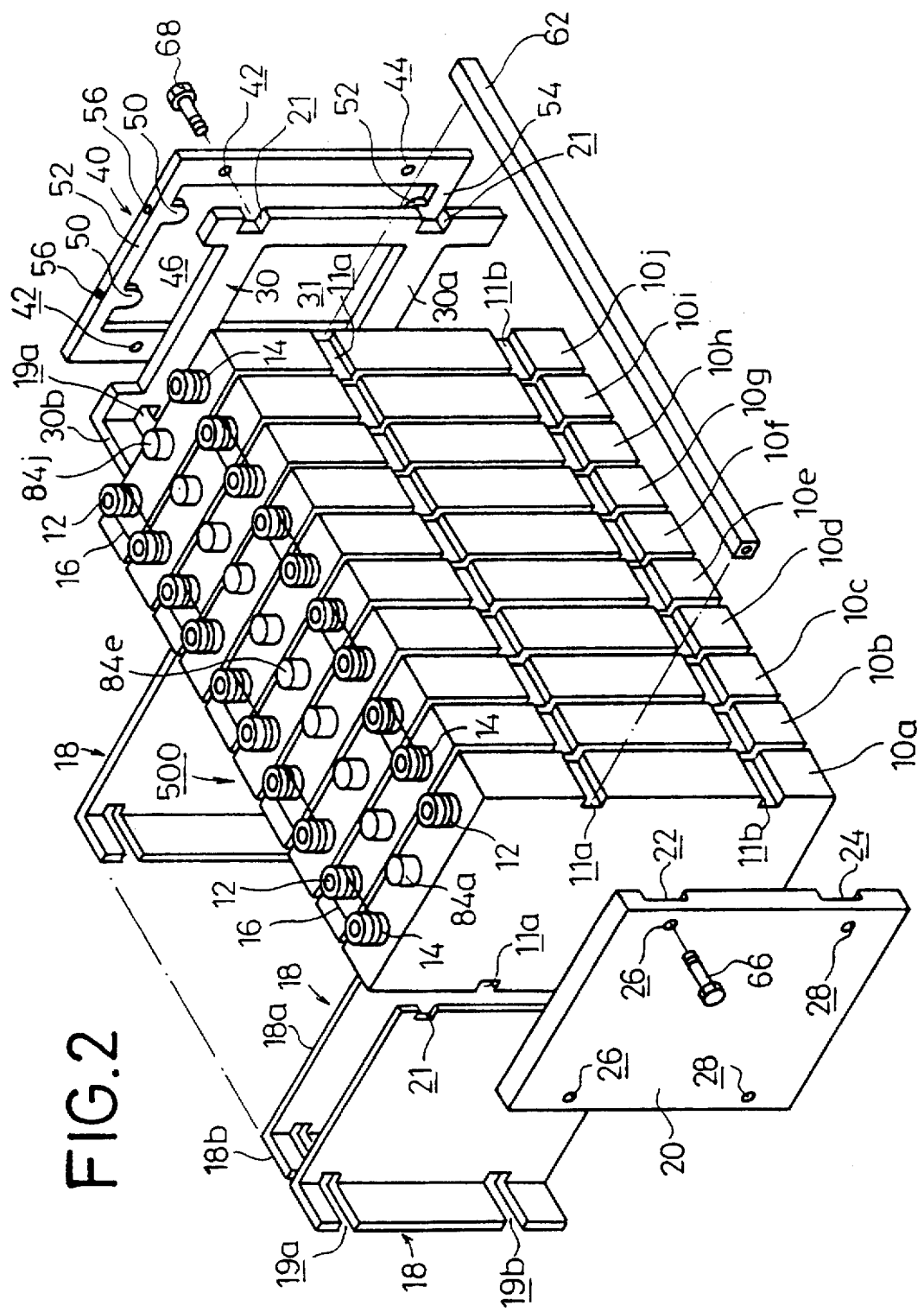
FIG. 2 is an exploded perspective view of the battery assembly containing heat exchange members according to a first embodiment of the present invention shown in FIG. 1.

As shown in FIGS. 1 and 2, a battery assembly 500 according to a first embodiment of the present invention has a linear stacked array of unit batteries 10a–10j such as nickel hydrogen batteries or the like. Each of the unit batteries 10a–10j comprises a casing molded of synthetic resin having a pair of positive and negative terminals 12, 14 on its upper end for supplying electrical energy stored in the unit battery. The unit batteries 10a–10j are oriented alternately in opposite directions such that the positive and negative terminals 12, 14 of adjacent unit batteries are positioned adjacent to each other and are interconnected by conductive wires 16. Specifically, the negative terminal 14 of the unit battery 10a is mechanically firmly and electrically connected to the positive terminal 12 of the adjacent unit battery 10b by a conductive wire 16. The other unit batteries 10b–10j are mechanically firmly and electrically connected through their positive and negative terminals 12, 14 in a similar pattern. The unit batteries 10a~10j thus connected jointly make up the battery assembly 500. As shown in FIG. 2, each of the unit batteries 10a~10j has an upper pair of horizontal grooves 11a defined in upper portions of opposite transverse side walls of the unit batteries and a lower pair of horizontal grooves defined in lower portions of the opposite transverse side walls thereof at a position downwardly spaced from the upper pair of horizontal grooves 11a.

The battery assembly 500 also includes a plurality of vertical heat-transfer plates 18 each placed between adjacent two of the unit batteries 10a~10j. Each of the heat-transfer plates 18 has an L-shaped horizontal cross section. Each of the heat-transfer plates 18 comprises a first heat-exchange planar member 18a sandwiched between adjacent mutually facing walls of two of the unit batteries 10a~10j, and a second heat-exchange planar member 18b bent at a right angle from a vertical edge of the first heat-exchange planar member 18a and positioned outside of, and held against, one of the outwardly facing transverse side wall surfaces of the adjacent two of the unit batteries 10a~10j. For example, the first heat-exchange planar member 18a of one of the heat-transfer plates 18 is sandwiched between mutually facing walls of the unit batteries 10a, 10b, and the first heat-exchange planar member 18a of an adjacent one of the heat-transfer plates 18 is sandwiched between the mutually facing walls of unit batteries 10b, 10c. Each of the heat-transfer plates 18 has a pair of vertically spaced, horizontal slots 19a, 19b defined in the second heat-exchange planar member 18b and a joined edge portion of the first heat-exchange planar member 18a, and a pair of vertically spaced recesses 21 defined in a vertical edge of the first heat-exchange planar member 18a remote from the second heat-exchange planar member 18b.

Each of the heat-transfer plates 18 is made of sheet metal having a high thermal conductivity, such as aluminum or copper. The first heat-exchange planar member 18a of each of the heat-transfer plates 18 has a horizontal length substantially equal to the horizontal longitudinal length of the unit batteries 10a~10j, and the second heat-exchange planar member 18b has a horizontal length equal to the sum of the horizontal transverse length of the unit batteries 10a~10j and the thickness of the first heat-exchange planar member 18a.

A first holder plate 20 is held against an outer surface of the unit battery 10a. The first holder plate 20, which is in the form of a metal plate, has upper and lower pairs of horizontal spaces or recesses 22, 24 defined in an inner surface thereof and upper and lower pairs of bolt insertion holes 26, 28 defined in side edges thereof through the respective upper and lower pairs of horizontal recesses 22, 24.

A heat-transfer plate 30 which is slightly different in shape from the heat-transfer plates 18 is held against an outer surface of the unit battery 10j. The heat-transfer plate 30 has a first heat-exchange planar member 30a corresponding to the first heat-exchange planar member 18a of each of the heat-transfer plates 18 and a second heat-exchange planar member 30b corresponding to the second heat-exchange planar member 18b of each of the heat-transfer plates 18. The first heat-exchange planar member 18a has a large rectangular opening 31 defined centrally therein. The heat-transfer plate 30 also has a pair of vertically spaced horizontal slots 19a, 19b defined in the second heat-exchange planar member 30b and a joined edge portion of the first heat-exchange planar member 30a, and a pair of vertically spaced recesses 21 defined in a vertical edge of the first heat-exchange planar member 30a remote from the second heat-exchange planar member 30b.

A second holder plate 40 is held against an outer surface of the heat-transfer plate 30. The second holder plate 40 has upper and lower pairs of holes 42, 44 defined in side edges thereof in alignment with the respective upper and lower pairs of bolt insertion holes 26, 28 of the first holder plate 20. The second holder plate 40 also has a large rectangular opening 46 defined centrally therein.

The second holder plate 40 includes an upper horizontal beam 52 on its upper end and a lower horizontal beam 54 on its lower end. The upper horizontal beam 52 has a pair of horizontal spaced lobes 50 projecting downwardly toward the lower horizontal beam 54 and a pair of threaded holes 56 defined in the respective lobes 50. Similarly, the lower horizontal beam 54 has a pair of horizontal spaced lobes 53 projecting downwardly toward the upper horizontal beam 52 and a pair of threaded holes (not shown) defined in the respective lobes 53.

Two pairs of upper and lower rods 62, 64 extend horizontally between the first and second holder plates 20, 40. Specifically, the upper rods 62 are fitted in the horizontal grooves 11a defined in the upper opposite transverse side walls of the unit batteries 10a~10j and also in the slots 19a and the recesses 21 of the heat-transfer plates 18, 30. The upper rods 62 are fastened to the first and second holder plates 20, 40 by bolts 66, 68 which are inserted through the bolt insertion holes 26 in the first and second holder plates 20, 40 and threaded into threaded holes defined in the opposite ends of the upper rods 62. Likewise, the lower rods 64 are fitted in the horizontal grooves 11b defined in the lower opposite transverse side walls of the unit batteries 10a~10j and also in the slots 19b and the recesses 21 of the heat-transfer plates 18, 30. The upper rods 62 are fastened to the first and second holder plates 20, 40 by bolts (not shown) which are inserted through the bolt insertion holes 28 in the first and second holder plates 20, 40 and threaded into threaded holes defined in the opposite ends of the upper rods 62. When the upper and lower rods 62, 64 are thus fastened, the unit batteries 10a~10j are assembled as the battery assembly 500 with the heat-transfer plates 18 sandwiched between the unit batteries 10a~10j, as shown in FIG. 1. In this embodiment, the positive terminal 12 of the unit battery 10a and the negative terminal 14 of the unit battery 10j are shown exposed, and the other positive and negative terminals of the unit batteries 10a~10j are shown covered with protective covers 80a~80i that extend between adjacent ones of the unit batteries 10a~10j. The unit batteries 10a~10j have respective gas relief valves 84a~84j disposed substantially centrally on the upper ends thereof and covered with a protective cover 82 which extends across the unit batteries 10a~10j.

The battery assembly 500 of the above structure is typically installed on an electric vehicle. When the electric vehicle runs, the electric energy stored in the battery assembly 500 is consumed, and the unit batteries 10a~10j generate heat. The heat generated by the unit batteries 10a~10j is transferred from the first heat-exchange planar members 18a to the second heat-exchange planar members 18b of the heat-transfer plates 18. Then, the heat is dissipated from the second heat-exchange planar members 18b into the atmospheric air through a heat exchange. As a result, the heated unit batteries 10a~10j are cooled by the first heat-exchange planar members 18a which are cooled by the second heat-exchange planar members 18b that are held in contact with the atmospheric air. Consequently, the heated unit batteries 10a~10j are kept in a desired temperature range for supplying a desired voltage to circuits on the electric vehicle.

FIG. 3 shows a battery assembly according to a second embodiment of the present invention. The battery assembly according to the second embodiment differs from the battery assembly 500 according to the second embodiment in that it has a plurality of heat-transfer plates 90 each of a T-shaped horizontal cross section which are used in place of the heat-transfer plates 18 according to the first embodiment. The heat-transfer plates 90 are also made of sheet metal having a high thermal conductivity, such as aluminum or copper. Each of the heat-transfer plates 90 comprises a first heat-exchange planar member 90a and a pair of second heat-exchange planar members 90b, 90c bent at a right angle from a vertical edge of the first heat-exchange planar member 90a. The second heat-exchange planar members 90b, 90c extend away from each other, and the vertical edge of the first heat-exchange planar member 90a is integrally joined to the junction between the second heat-exchange planar members 90b, 90c. The heat-transfer plates 90 are sandwiched respectively between the unit batteries 10b, 10c, between the unit batteries 10d, 10e, between the unit batteries 10f, 10g, and between the unit batteries 10h, 10i. The second heat-exchange planar members 90b, 90c of the heat-transfer plates 90 are held against and cover respective transverse side wall surfaces of the unit batteries 10b–10i. The first and second heat-exchange planar members 30a, 30b of the heat-transfer plate 30 are held against and cover respective outer and transverse side wall surfaces of the unit battery 10j.

The first holder plate 20 has an integral second heat-exchange planar member 20a which is bent at a right angle from the base region of the first holder plate 20. The second heat-exchange planar member 20a is held against and cover a transverse side wall surface of the unit battery 10a.

The other details of the battery assembly according to the second embodiment are identical to those of the battery assembly 500 according to the first embodiment. The battery assembly according to the second embodiment operates in the same manner and offers the same advantages as the battery assembly 500 according to the first embodiment.

FIG. 4 shows a battery assembly according to a third embodiment of the present invention. The battery assembly according to the third embodiment has holder plates different from the holder plates 20, 40 according to the first and second embodiments, flat plates used in place of the rods 62, 64 according to the first and second embodiments, and heat-transfer plates different from the heat-transfer plates 18, 30, 90 according to the first and second embodiments.

Specifically, a first holder plate 100 is held against the outer surface of the unit battery 10a and has a rectangular frame 102 and a plurality of vertically spaced horizontal beams 104a, 104b, 104c extending parallel to each other in the rectangular frame 102. A second holder plate 106 is held against the outer surface of the unit battery 10j and has a structure which is essentially the same as that of the first holder plate 100.

A heat-transfer plate 110 is disposed between the unit batteries 10a, 10b to cover a transverse side wall of the unit battery 10a. The heat-transfer plate 110 comprises a first heat-exchange planar member 110a and a second heat-exchange planar member 110b which are integral with each other, and has a substantially T-shaped horizontal cross section. The first heat-exchange planar member 110a of the heat-transfer plate 110 is sandwiched between the unit batteries 10a, 10b, and the second heat-exchange planar member 10b thereof includes a longer portion covering the transverse side wall of the unit battery 10a. The second heat-exchange planar member 110b includes a shorter portion covering a substantially half of the transverse side wall of the unit battery 10b.

A heat-transfer plate 112 is disposed between the unit batteries 10b, 10c. The heat-transfer plate 112 comprises a first heat-exchange planar member 112a and a second heat-exchange planar member 112b which are integral with each other, and has a substantially T-shaped horizontal cross section. The first heat-exchange planar member 112a of the heat-transfer plate 112 is sandwiched between the unit batteries 10b, 10c, and the second heat-exchange planar member 112b thereof cover respective halves of the transverse side walls of the unit batteries 10b, 10c. Heat-transfer plates that are identical to the heat-transfer plate 112 are disposed between the unit batteries 10d–10i. A heat-transfer plate 114 which is symmetrically similar to the heat-transfer plate 110 is disposed between the unit batteries 10i, 10j. The heat-transfer plate 114 comprises a first heat-exchange planar member 114a corresponding to the first heat-exchange planar member 110a and a second heat-exchange planar member 114b corresponding to the second heat-exchange planar member 110b.

The second heat-exchange planar member 114b of the heat-transfer plate 114 has a longer portion covering the transverse outer side wall of the unit battery 10j, and a shorter potion covering a half of the transverse outer side wall of the unit battery 10i.

After the heat-transfer plates 110, 112, 114 have been sandwiched between the unit batteries 10a–10j, flat plates 116, 118 are placed so as to extend between the holder plates 100, 106 and then fastened thereto by bolts 120, thus completing the battery assembly.

The battery assembly according to the third embodiment operates in the same manner and offers the same advantages as the battery assemblies according to the first and second embodiments of the present invention.

FIG. 5 shows a battery assembly according to a fourth embodiment of the present invention. According to the fourth embodiment, the battery assembly employs heat-transfer plates identical to the heat-transfer plate 112 shown in FIG. 4, and has first and second holder plates 126, 128 comprising respective first heat-exchange planar members 126a, 128a held against and covering respective outer surfaces of the unit batteries 10a, 10j and respective second heat-exchange planar members 126b, 128b held against and covering respective halves of transverse side walls of the unit batteries 10a, 10j. Recesses 129 are defined between adjacent ones of the unit batteries 10a, 10j for receiving therein the first heat-exchange planar members 112a of the heat-transfer plates 112. Fastening rod 127 extend between the first and second holder plates 126, 128. The battery assembly according to the fourth embodiment operates in the same manner and offers the same advantages as the battery assembly according to the third embodiment of the present invention.

FIG. 6 shows a battery assembly 500 according to a fifth embodiment of the present invention. The battery assembly 500 according to the fifth embodiment includes a plurality of heat-transfer plates 130 each having a substantially L-shaped horizontal cross section and composed of a first heat-exchange planar member 130a and a second heat-exchange planar member 130b. Each of the heat-transfer plates 130 is of a relatively large thickness and has four holes 132 of rectangular cross section defined in the first heat-exchange planar member 130a and extending in its longitudinal direction. The holes 132 defined in the heat-transfer plates 130 increase the surface areas thereof available for dissipating heat through a heat exchange, so that the heat can be radiated more efficiently from the battery assembly 500.

FIG. 7 shows a battery assembly according to a sixth embodiment of the present invention. The battery assembly according to the sixth embodiment differs from the battery assembly 500 according to the first embodiment shown in FIGS. 1 and 2 in that each of heat-transfer plates 134 has a recess 136 defined therein. Specifically, each of heat-transfer plates 134 has a substantially L-shaped horizontal cross section and is composed of a first heat-exchange planar member 134a and a second heat-exchange planar member 134b. The recess 136 is defined in the first heat-exchange planar member 134a in view of the thermal energy distribution of the unit batteries 10a~10j. Specifically, the recesses 136 of the heat-transfer plates 136 are positioned adjacent to respective lower portions of the unit batteries 10a~10j, leaving other portions of the heat-transfer plates 136 exposed to surfaces of the unit batteries 10a~10j where most heat is generated. The recesses 136 serve to reduce the weight of the heat-transfer plates 136.

FIG. 8 illustrates a battery assembly according to a seventh embodiment of the present invention. The battery assembly according to the seventh embodiment has a plurality of heat-transfer plates 140 each having a channel-shaped horizontal cross section and composed of a first heat-exchange planar member 140a, a second heat-exchange planar member 140b, and a third heat-exchange planar member 140c. The first heat-exchange planar members 140a of the heat-transfer plates 140 are sandwiched between adjacent ones of the unit batteries 10a~10j, and the second and third heat-exchange planar members 140b, 140c cover opposite transverse side walls of the unit batteries 10a~10j. The heat-transfer plates 140 interposed between adjacent ones of the unit batteries 10a~10j operate in the same manner and offer the same advantages as the L- or T-shaped heat-transfer plates of the battery assemblies according to the first through sixth embodiments. In addition, the heat-transfer plates 140 are further advantageous in that each of the heat-transfer plates 140 is capable of cooling the opposite transverse side walls of one of the unit batteries 10a~10j.

FIG. 9 illustrates a battery assembly according to an eighth embodiment of the present invention. The battery assembly according to the eighth embodiment differs from the battery assemblies according to the first through seventh embodiments in that holder plates and heat-transfer plates are integrally formed with each other.

According to the eighth embodiment, first and second holder plates 150, 152 are integrally joined to each other by a second elongate heat-exchange planar member 154 extending perpendicularly between the first and second holder plates 150, 152 at respective vertical edges thereof, and first heat-exchange planar members 156a~156i project integrally from the second heat-exchange planar member 154 parallel to the first and second holder plates 150, 152 and are spaced at intervals substantially equal to the horizontal lengths of the transverse side walls of the unit batteries 10a~10j.

The first and second holder plates 150, 152 and the second heat-exchange planar member 154 integral therewith jointly serve as a battery box. The unit batteries 10a~10j are inserted in spaces defined between the first and second holder plates 150, 152 and the first heat-exchange planar members 156a~156i. Horizontally elongate flat plates 158 extend between the first and second holder plates 150, 152 across side walls of the unit batteries 10a~10j remote from the second heat-exchange planar member 154. The flat plates 158 are fastened at their opposite ends to vertical side edges of the first and second holder plates 150, 152 by bolts (not shown), holding the inserted unit batteries 10a~10j in place. The first and second holder plates 150, 152 and the second heat-exchange planar member 154, which may be in the form of an integral unitary casting, are rugged and easy to handle, and can be manufactured inexpensively.

FIG. 10 illustrates a battery assembly according to a ninth embodiment of the present invention, which is similar to the battery assembly according to the eighth embodiment except that the second heat-exchange planar member has cooling air inlet passages and the holder plates have a different structure. Specifically, the battery assembly has a first holder plate 160 and a second holder plate 166 which are integrally joined by a second heat-exchange planar member 164. The first holder plate 160 has an upper pair of lobes 161a, 161b projecting downwardly from an upper horizontal beam thereof and a lower pair of lobes 163a, 163b projecting upwardly from a lower horizontal beam thereof in alignment with the respective lobes 161a, 161b. A diagonal stiffener 165 is fixed to the lobes 161a, 161b, 163a, 163b by screws (not shown) threaded into threaded holes (not shown) defined in the respective lobes 161a, 161b, 163a, 163b. The second holder plate 166 is identical to the first holder plate 160. A plurality of cooling air inlet passages 162a~162f which are vertically arrayed are defined horizontally in the second heat-exchange planar member 164, and have ends opening at a vertical side edge of the first holder plate 160 and opposite ends (not shown) opening at a vertical side edge of the second holder plate 166. The cooling air inlet passages 162a~162f provide an increased surface area for contacting air within the second heat-exchange planar member 164 for thereby cooling the second heat-exchange planar member 164 efficiently. A fan or a suitable air blower may be connected to the cooling air inlet passages 162a~162f.

FIG. 11 shows a battery assembly 500 according to a tenth embodiment of the present invention. The battery assembly 500 according to the tenth embodiment differs from the battery assemblies according to the first through ninth embodiments in that each of a plurality of heat-transfer plates 170 has a second heat-exchange planar member 170b for cooling bottom walls of the unit batteries 10a~10j. Specifically, each of the heat-transfer plates 170 has an L-shaped vertical cross section and is composed of a first heat-exchange planar member 170a lying vertically with the second heat-exchange planar member 170b extending horizontally perpendicularly from a lower edge of the first heat-exchange planar member 170a. The heat-transfer plates 170 of the above structure are preferable for use in a battery assembly which needs to radiate heat through a heat exchange from its bottom.

FIG. 12 shows a battery assembly according to an eleventh embodiment of the present invention. The battery assembly according to the eleventh embodiment differs from the battery assemblies according to the previous embodiments in that the unit batteries 10a~10j are liquid-cooled for a heat exchange according to the eleventh embodiment, whereas the unit batteries 10a~10j are air-cooled for a heat exchange according to the previous embodiments. The battery assembly according to the eleventh embodiment is structurally similar to the battery assembly according to the eighth embodiment shown in FIG. 9. As shown in FIG. 12, a second heat-exchange planar member 184 extends between and is integrally formed with first and second holder plates 180, 182, and first heat-exchange planar members 186a~186i project integrally from the second heat-exchange planar member 184 parallel to the first and second holder plates 180, 182 and are spaced at intervals substantially equal to the horizontal lengths of the transverse side walls of the unit batteries 10~10j. A tortuous coolant tube 190 bent substantially in the shape of an inverted S is integrally mounted on a surface of the second heat-exchange planar member 184 remote from the first heat-exchange planar members 186a~186i. The tortuous coolant tube 190 is preferably made of a material having a high thermal conductivity such as aluminum or copper, as with the second heat-exchange planar member 184. Coolant conduits 192, 194 are connected to the respective first and second holder plates 180, 182 in communication with the opposite open ends of the tortuous coolant tube 190.

The unit batteries 10a~10j are inserted between the first holder plate 180, the first heat-exchange planar members 186a~186i, and the second holder plate 182, and held securely in place by plates 196 that are fastened at opposite ends thereof to vertical edges of the first and second holder plates 180, 182 remote from the second heat-exchange planar member 184. When a coolant or cooling water is introduced from the coolant conduit 192 into the tortuous coolant tube 190, the cooling water flows through the tortuous coolant tube 190 along the second heat-exchange planar member 184 until it reaches the coolant conduit 194 while at the same time absorbing heat generated by the unit batteries 10a~10j. Since the tortuous coolant tube 190 is made of a material having a high thermal conductivity such as aluminum or copper, a heat exchange is effected highly efficiently between the second heat-exchange planar member 184 and the coolant.

Upon such a heat exchange, the second heat-exchange planar member 184 and also the first heat-exchange planar members 186a~186i are cooled, so that the unit batteries 10a~10j can be cooled into a desired temperature range.

FIG. 13 schematically shows a system for water-cooling or -heating the battery assembly shown in FIG. 12, which is mounted on an electric vehicle.

The electric vehicle, generally denoted at 200, has a heat-exchange radiator 202 on its front end and an electric motor 204 on its rear end for rotating rear wheels thereof. The electric vehicle 200 supports on its central portion a plurality of battery assemblies 500 each composed of the unit batteries 10a~10j. Each of the battery assemblies 500 has the second heat-exchange planar member 184 combined with the tortuous coolant tube 190.

The radiator 202, the electric motor 204, and the second heat-exchange planar members 184 are interconnected by a piping 206 to which there are connected a main pump 208, a solenoid-operated valve 210, an electric heater 212, and an auxiliary pump 214.

When the main pump 208 is actuated, cooling water cooled by the radiator 202 flows through the solenoid-operated valve 210 into the tortuous tubes 190 on the second heat-exchange planar members 184, thereby cooling the second heat-exchange planar members 184. At the same time, the cooling water is introduced into the electric motor 204, thereby cooling the electric motor 204. For heating the unit batteries 10a~10j to a desired temperature through the second heat-exchange planar members 184, the solenoid-operated valve 210 is operated to direct the cooling water to the electric heater 212 which heats the cooling water. The auxiliary pump 214 is actuated to supply the heated cooling water to the tortuous pipes 190 on the heat-exchange planar members 184, thereby heating the heat-exchange planar members 184.

FIG. 14 shows a battery assembly according to a twelfth embodiment of the present invention. The battery assembly according to the twelfth embodiment differs from the battery assembly according to the ninth embodiment shown in FIG. 10 in that the bottom walls of the unit batteries are cooled or heated by a liquid. Specifically, as shown in FIG. 14, a heat-transfer plate 250 comprises a plurality of parallel first heat-exchange planar members 252 extending parallel to each other and a second heat-exchange planar member 254 perpendicularly interconnecting the first heat-exchange planar members 252 at lower edges thereof. The second heat-exchange planar member 254 is of a relatively large thickness and has coolant passages 256a~256d defined longitudinally therethrough. When a liquid such as cooling water flows through the coolant passages 256a~256d, the bottoms of the unit batteries 10a~10j are forcibly cooled by the cooling water. Instead, hot water may be supplied to the coolant passages 256a~256d to heat the bottoms of the unit batteries 10a~10j.

FIG. 15 shows a battery assembly according to a thirteenth embodiment of the present invention. The battery assembly according to the thirteenth embodiment includes a second heat-exchange planar member 304 integrally formed with, and extending from, a vertical edge of a first holder plate 300 to a vertical edge of a second holder plate 302. The battery assembly has no first heat-exchange planar members parallel to the first and second holder plates 300, 302. A heat-transfer plate 306 is embedded in and fixed to one longitudinal side wall of each of the unit batteries 10a~10j. The heat-transfer plate 306 projects outwardly slightly from the longitudinal side wall of each of the unit batteries 10a~10j, and is held in contact with the other longitudinal side wall of an adjacent unit battery.

The unit batteries 10a~10j with the heat-transfer plates 306 combined therewith are placed between the first and second holder plates 300, 302, and held together under pressure by plates 308 that extend between and are fastened to the first and second holder plates 300, 302. When the unit batteries 10a~10j are thus put together, the heat-transfer plates 306 are firmly pressed against the unit batteries 10a~10j. At this time, the heat-transfer plates 306 have transverse side edges pressed perpendicularly against the second heat-exchange planar member 304.

Heat generated by the unit batteries 10a~10j is transferred from the heat-transfer plates 306 to the second heat-exchange planar member 304, from which it is radiated into the atmospheric air through a heat exchange. Since the heat-transfer plates 306 are embedded partly in the unit batteries 10a~10j, they can be handled with ease. Each of the heat-transfer plates 306 may have a recess positioned depending on the thermal energy distribution of the unit batteries in the same manner as shown in FIG. 7.

FIG. 16 shows a battery assembly according to a fourteenth embodiment of the present invention. According to the fourteenth embodiment, the battery assembly, which may be any one of the battery assemblies according to the above embodiments, is housed in a battery box 600. The battery box 600 comprises a plurality of vertical flat water jackets 610 of polypropylene, which are inserted between the battery assemblies 500 to abut to the second heat-exchange planner member 18b. The water jackets 610 have passages 612 disposed therein for circulating a heat-exchange fluid such as oil, a coolant, water, or the like, in a fluid-tight manner therein. The passages 612 communicate with inlet ports that are connected to a first pipe 614 for introducing the heat-exchange liquid under pressure and upper outlet ports that are connected to a second pipe 616 for discharging the heat-exchange liquid to which the heat generated by the unit batteries has been transferred.

When the heat-exchange liquid is supplied from the first pipe 614 to the passages 612 in the water jackets 610, the heat generated by the battery assemblies 500 is transferred to the heat-exchange liquid, and then discharged out through the second pipe 616. The water jackets 610 according to the fourteenth embodiment allow the generated heat to be radiated stably and efficiently through a heat exchange.

Each water jacket 610 contacts the second heat-exchange planer member of the heat-transfer plates 90 shown in FIG. 3.

With the arrangement of the present invention, the heat-transfer plates sandwiched between the unit batteries of the battery assembly are heated when the unit batteries operate to supply a current therefrom. The generated heat is dissipated from the heat-exchange planar members of the heat-transfer plates which extend outwardly from the unit batteries, so that the unit batteries can be cooled. Therefore, the heat-transfer plates are effective to keep the unit batteries in a desired temperature range in use.

If the unit batteries of the battery assembly are at a temperature lower than the desired temperature range, then a heated medium such as hot water is supplied to the heat-transfer plates to heat the heat-transfer plates. The heat is then applied from the heat-transfer plates to the unit batteries, thus heating the unit batteries into the desired temperature range.

The first and second heat-exchange planar members of each of the heat-transfer plates may be joined in a substantially L-shaped horizontal cross section. With such an L-shaped heat-transfer plate configuration, the first heat-exchange planar member is held against a longitudinal wider side wall of the unit battery, and the second heat-exchange planar member against a transverse narrower side wall of the unit battery. Therefore, the second heat-exchange planar member is exposed between two adjacent unit batteries. As all the transverse narrower side walls of the unit batteries are covered with the second heat-exchange planar members, they provide a very high heat-exchange efficiency. The first and second heat-exchange planar members of each of the heat-transfer plates may alternatively be joined in a substantially T- or channel-shaped horizontal cross section. One of the first and second heat-exchange planar members may be of an increased thickness, and may have grooves or passages for an increased surface of contact with the atmospheric air or for introducing a cooling or heating medium for a more efficient heat exchange.

Furthermore, the battery assembly also has first and second holder plates for holding the heat-transfer plates and the unit batteries tightly in position, and fastening means for securely fastening the unit batteries together. Therefore, the unit batteries are prevented from being expanded under the pressure of a gas produced in the unit batteries. Since the fastening means may comprise plates or rods, the unit batteries can easily and inexpensively be fastened together thereby. If the first and second holder plates are integrally formed with the second heat-exchange planar plate, the total number of parts used is reduced, and they can easily be formed as an integral unitary casting.

The second heat-exchange planar member may have a flow passage, and a temperature-controlling medium may be supplied to the flow passage for cooling or heating the unit batteries quickly into a desired temperature range with an increased heat-exchange efficiency.

If a first heat-exchange planar member is combined with a unit battery, then a second heat-exchange planar member is simplified in structure and provides an increased heat-exchange efficiency.

Each of the heat-transfer plates may have a recess shaped depending on the thermal energy distribution of a unit battery for a reduction in the weight of the battery assembly.

As described above, the battery assembly according to the present invention allows the unit batteries to radiate heat effectively through a heat exchange. Therefore, the battery assembly can be used in a preferable temperature range for producing a desired voltage or current efficiently and also increasing the longevity of the unit batteries.

Since the casings of synthetic resin of the unit batteries are firmly secured in position by the holder plates and the rods or plates that are fastened to the holder plates, the casings of the unit batteries are prevented from being expanded under the pressure of a gas produced in the casings, and variations of the dimensional accuracy of the casings are sufficiently absorbed or compensated for. Consequently, the wall thickness of the casings can be reduced, and, as a result, the battery assembly can be of a simplified structure and a small size.

Although certain preferred embodiments of the present invention have been shown and described in detail, it should be understood that various changes and modifications may be made therein without departing from the scope of the appended claims.

What is claimed is:

1. A battery assembly comprising:
   a stacked array of closely spaced unit batteries having first side walls disposed in mutually facing relation and second side walls facing outwardly of said battery assembly;
   a plurality of heat-transfer plates each composed of a first heat-exchange planar member sandwiched between, and held against, first side walls of an adjacent pair of the unit batteries, and a second heat-exchange planar member integrally joined to said first heat-exchange planar member and projecting outwardly from the second side wall of at least one of the adjacent pair of the unit batteries;
   holding means for holding said array of closely positioned unit batteries and said heat-transfer plates together; and
   a temperature control mechanism for controlling a temperature of the unit batteries through a heat exchange carried out by said first heat-exchange planar members and said second heat-exchange planar members.

2. A battery assembly according to claim 1, wherein each of the unit batteries is shaped as a rectangular parallelpiped, said first heat-exchange planar member and said second heat-exchange planar member being of a substantially L-shaped structure, said first heat-exchange planar member being held against a first side wall of each of the unit batteries, said second heat-exchange planar member being held against a second side wall of each of the unit batteries, said second side wall having a width narrower than that of said first side wall of each unit battery.

3. A battery assembly according to claim 1, wherein at least one of said first heat-exchange planar members and said second heat-exchange planar members contain a wall having a flow passage defined therein for passing a heat-exchange medium therethrough.

4. A battery assembly according to claim 1, wherein each of the unit batteries is shaped as a rectangular parallelpiped, said first heat-exchange planar member and said second heat-exchange planar member being of a substantially T-shaped structure, said first heat-exchange planar member being held against a first side wall of each of the unit batteries, said second heat-exchange planar member being held against at least portions of second side walls of adjacent two of the unit batteries, said second side wall having a width narrower than that of said first side wall of each unit battery.

5. A battery assembly according to claim 1, wherein each of the unit batteries is shaped as a rectangular parallelpiped, said first heat-exchange planar member and said second heat-exchange planar member being of a substantially channel-shaped structure, said first heat-exchange planar member being held against a first side wall of each of the unit batteries, said second heat-exchange planar member being held against at least portions of confronting second side walls of each of the unit batteries said second side wall having a width narrower than that of said first side wall of each unit battery.

6. A battery assembly according to claim 1, wherein said holding means comprises a first holder plate held against one of the unit batteries at one end of said array, a second holder plate against one of the unit batteries at an opposite end of said array, and fastening means for fastening said unit batteries and said heat-transfer plates which are held between said first holder plate and said second holder plate.

7. A battery assembly according to claim 6, wherein said fastening means comprises a plate or a rod extending between said first holder plate and said second holder plate and screws threaded through said plate or said rod into said first holder plate and said second holder plate.

8. A battery assembly according to claim 1, wherein each of the unit batteries is shaped as a rectangular parallelpiped, said second heat-exchange planar member being substantially coextensive with said array of unit batteries, said first heat-exchange planar member comprising a plurality of first heat-exchange planar members projecting from said second heat-exchange planar member parallel to each other at intervals corresponding to a length of a second side wall of each of the unit batteries.

9. A battery assembly according to claim 8, wherein said holding means comprises a first holder plate held against one of the unit batteries at one end of said array, a second holder plate against one of the unit batteries at an opposite end of said array, and fastening means for fastening said unit batteries and said heat-transfer plates which are held between said first holder plate and said second holder plate, said first holder plate and said second holder plate being integrally formed with said second heat-exchange planar member.

10. A battery assembly according to claim 9, wherein said fastening means comprises a plate or a rod extending between said first holder plate and said second holder plate and screws threaded through said plate or said rod into said first holder plate and said second holder plate.

11. A battery assembly according to claim 8, wherein said temperature control mechanism comprises a flow passage defined in said second heat-exchange planar member for passing a heat-exchange medium therethrough for a heat exchange with the unit batteries.

12. A battery assembly according to claim 11, wherein said flow passage comprises a tortuous tube fixedly mounted on said second heat-exchange planar member.

13. A battery assembly according to claim 11, wherein said flow passage is contained within the interior of said second heat-exchange planar member.

14. A battery assembly according to claim 1, wherein each of said heat-transfer plates has a recess defined therein for disposition adjacent a region of thermal energy distribution of the unit batteries which is less than the thermal energy distribution of the remaining region thereof.

15. A battery assembly according to claim 1, wherein each of said unit batteries comprises a nickel hydrogen battery.

16. A battery assembly comprising:

a stacked array of closely positioned unit batteries having first side walls disposed in mutually facing relation and second side walls facing outwardly of said battery assembly;

a plurality of first heat-transfer plates, each having a heat-exchange planar member held against the first side walls of an adjacent pair of said unit batteries;

holding means for holding said unit batteries and said first heat-transfer plates together;

a plurality of second heat-transfer plates disposed respectively on said second side walls of said unit batteries said first heat-transfer plates being held in contact with said second heat transfer plates; and a temperature control mechanism for controlling a temperature of the unit batteries through a heat exchange carried out by said first heat-transfer plates and said second heat-transfer plates.

17. A battery assembly according to claim 16, wherein said first heat-transfer plates are partly embedded respectively in said first side walls of said unit batteries.

18. A battery assembly according to claim 17, wherein each of said first heat-transfer plates has a recess defined therein for disposition adjacent a region of thermal energy distribution of the unit batteries which is less than the thermal energy distribution of the remaining region thereof.

19. A battery assembly according to claim 18, wherein each of said unit batteries comprises a nickel hydrogen battery.

* * * * *